United States Patent
Iwamura (10) Patent No.: US 9,248,697 B2
(45) Date of Patent: Feb. 2, 2016

(54) AIRLESS TIRE

(71) Applicant: SUMITOMO RUBBER INDUSTRIES, LTD., Kobe-shi (JP)

(72) Inventor: Wako Iwamura, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 114 days.

(21) Appl. No.: 14/247,775

(22) Filed: Apr. 8, 2014

(65) Prior Publication Data

US 2014/0332127 A1   Nov. 13, 2014

(30) Foreign Application Priority Data

May 7, 2013   (JP) .................................. 2013-097804

(51) Int. Cl.
| | |
|---|---|
| *B60B 9/26* | (2006.01) |
| *B60B 1/06* | (2006.01) |
| *B60C 7/18* | (2006.01) |
| *B60B 19/10* | (2006.01) |

(52) U.S. Cl.
CPC . *B60B 1/06* (2013.01); *B60B 19/10* (2013.01); *B60C 7/18* (2013.01); *B60B 2900/1216* (2013.01); *B60B 2900/131* (2013.01); *B60C 2007/146* (2013.04)

(58) Field of Classification Search
CPC .............. B60C 7/00; B60C 7/10; B60B 9/10; B60B 9/12; B60B 9/26
See application file for complete search history.

(56) References Cited

U.S. PATENT DOCUMENTS

| | | | | |
|---|---|---|---|---|
| 2,050,352 | A * | 8/1936 | Martin | B60C 7/125 152/209.1 |
| 2,634,816 | A * | 4/1953 | Martin | B62D 61/065 152/7 |
| 5,313,994 | A * | 5/1994 | Hill, III | B29D 30/02 152/301 |
| 7,013,939 | B2 * | 3/2006 | Rhyne | B60B 1/0223 152/246 |
| 7,418,988 | B2 * | 9/2008 | Cron | B60C 7/18 152/11 |

(Continued)

FOREIGN PATENT DOCUMENTS

| | | |
|---|---|---|
| JP | 2007-118913 A | 5/2007 |
| JP | 2008-260514 | 10/2008 |
| JP | 2009-35051 A | 2/2009 |

OTHER PUBLICATIONS

Extended European Search Report issued Sep. 26, 2014 in Patent Application No. 14162593.9.

*Primary Examiner* — Brodie Follman
(74) *Attorney, Agent, or Firm* — Oblon, McClelland, Maier & Neustadt, L.L.P.

(57) ABSTRACT

An airless tire has a tread ring having a footprint, a hub positioned on a radially inner side of the tread ring and formed to be fixed to an axle, and a spoke connecting the tread ring and the hub and having a tread connection portion connected to an inner-circumferential surface of the ring and a hub connection portion connected to an outer-circumferential surface of the hub. The ring and the tread connection portion of the spoke satisfy $0 \leq E1 \leq 0.5$, $0 < E2 \leq 1.0$ and $0 \leq E3 < 0.3$, where E1, E2 and E3 represent ratios of first, second and third regions on the inner-circumferential surface of the ring and the first, second and third regions are divided based on a tire axial component length of the tread connection portion measured at a point in a circumferential direction of the ring.

19 Claims, 7 Drawing Sheets

(56) References Cited

U.S. PATENT DOCUMENTS

| | | | | |
|---|---|---|---|---|
| 8,960,248 B2 * | 2/2015 | Cron | ..................... | B60C 7/18 |
| | | | | 152/246 |
| 2011/0240190 A1 * | 10/2011 | Summers | ............ | G06F 17/5095 |
| | | | | 152/151 |
| 2012/0318417 A1 * | 12/2012 | Dotson | .................... | B60C 7/10 |
| | | | | 152/17 |
| 2014/0000777 A1 * | 1/2014 | Choi | ........................ | B60C 7/18 |
| | | | | 152/246 |
| 2014/0191565 A1 * | 7/2014 | Gebeau | .................. | B60B 15/00 |
| | | | | 301/41.1 |
| 2014/0332127 A1 * | 11/2014 | Iwamura | .................. | B60B 1/06 |
| | | | | 152/17 |
| 2015/0174954 A1 * | 6/2015 | Asper | ...................... | B60B 9/12 |
| | | | | 152/5 |

* cited by examiner

AIRLESS TIRE

CROSS-REFERENCE TO RELATED APPLICATIONS

The present application is based upon and claims the benefit of priority to Japanese Patent Application No. 2013-097804, filed May 7, 2013, the entire contents of which are incorporated herein by reference.

BACKGROUND OF THE INVENTION

1. Field of the Invention

The present invention relates to an airless tire with improved vibration reduction performance.

2. Description of Background Art

Conventionally, airless tires, for example, tires with a solid inner rubber structure, have been used mainly for industrial vehicles. Since tires with a solid inner rubber structure have greater mass and a low ability to absorb impact, they have not been employed in passenger cars, which prioritize riding comfort.

To improve the riding comfort of those airless tires and to make them suitable for passenger cars, a structure is proposed, such as radially arranging multiple fin-type spoke blades to connect a tread ring and a hub (hereinafter may be referred to as a "spoke structure") (for example, see Japanese Published Unexamined Patent Application 2008-260514). The entire contents of this publication are incorporated herein by reference.

SUMMARY OF THE INVENTION

According to one aspect of the present invention, an airless tire includes a tread ring having a footprint, a hub positioned on a radially inner side of the tread ring and formed to be fixed to an axle, and a spoke connecting the tread ring and the hub and having a tread connection portion connected to an inner-circumferential surface of the tread ring and a hub connection portion connected to an outer-circumferential surface of the hub. The tread ring and the tread connection portion of the spoke satisfy $0 \leq E1 \leq 0.5$, $0 < E2 \leq 1.0$ and $0 \leq E3 < 0.3$, where E1 represents a ratio of a first region on the inner-circumferential surface of the tread ring, E2 represents a ratio of a second region on the inner-circumferential surface of the tread ring, E3 represents a ratio of a third region on the inner-circumferential surface of the tread ring, the first region is a circumferential region occupying around an entire circumference of the airless tire and having a component length being zero times a tire axial-direction width on the inner-circumferential surface of the tread ring, the second region is a circumferential region occupying around the entire circumference of the airless tire and having the component length in a range of greater than zero times and smaller than 0.6 times the tire axial-direction width, the third region is a circumferential region occupying around the entire circumference of the airless tire and having the component length in a range of 0.6 times or greater and 1.0 times or less the tire axial-direction width, and the component length is a tire axial component length of the tread connection portion measured at a point in a circumferential direction of the tread ring.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
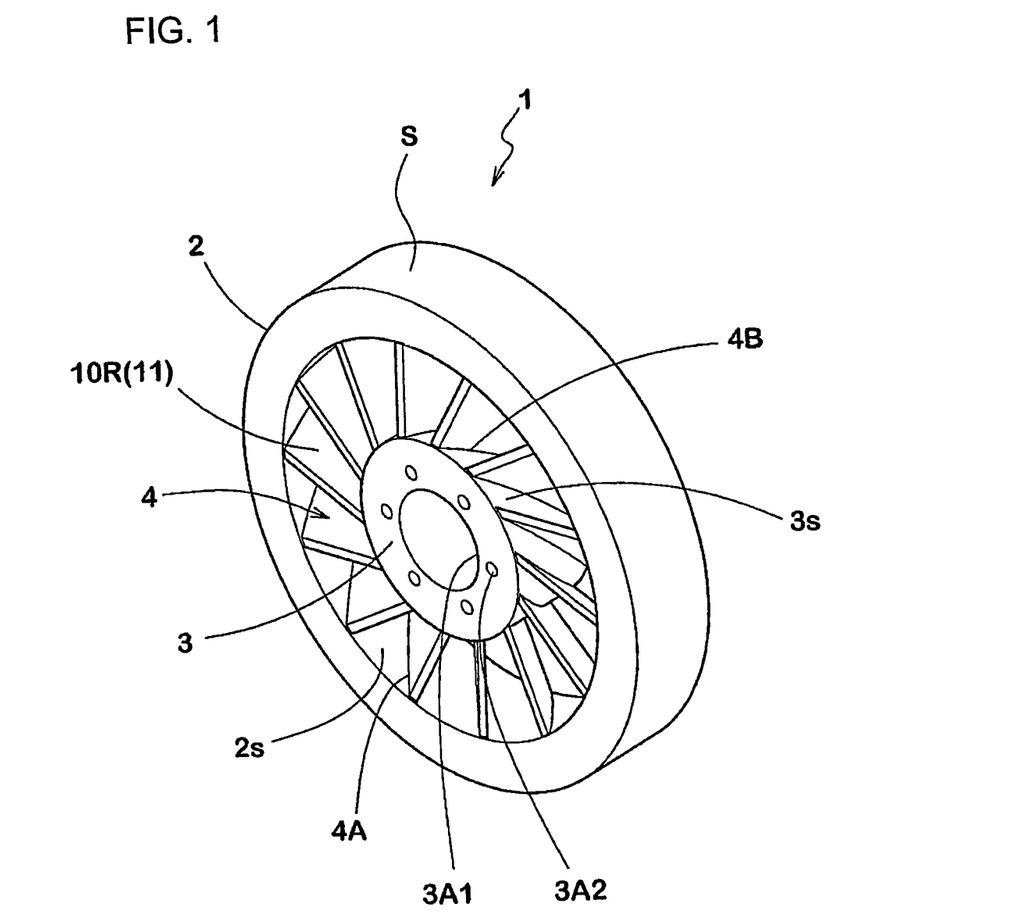
FIG. 1 shows a perspective view of an example of the airless tire according to an embodiment of the present invention.
Figure 2:
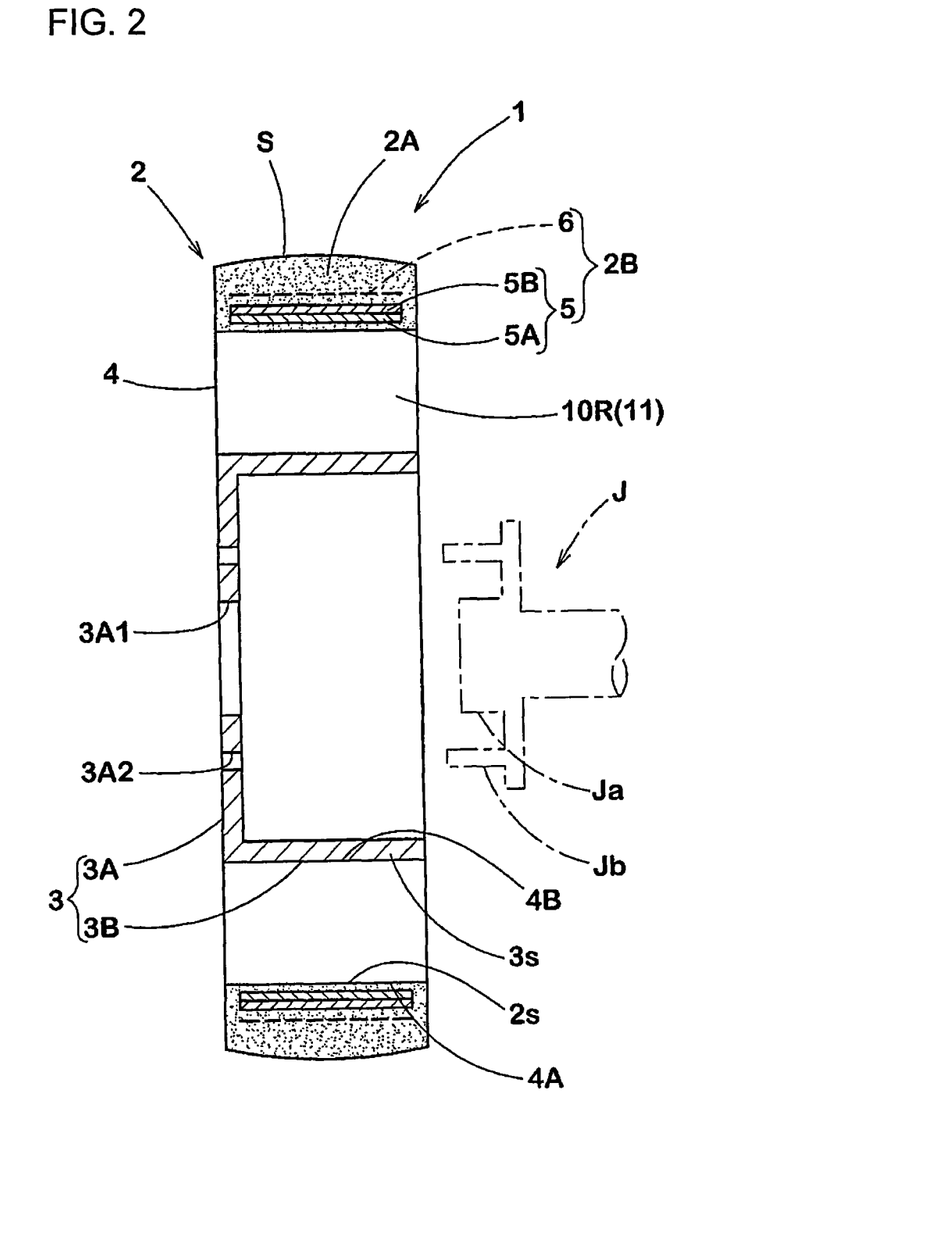
FIG. 2 shows a cross-sectional view of the example shown in FIG. 1.

As shown in FIGS. 1 and 2, an airless tire 1 according to an embodiment of the present invention has a columnar tread ring 2 having a footprint (S), a hub 3 which is arranged in the radially inner side of the tread ring 2 and fixed to an axle (J), and a spoke 4 connecting the tread ring 2 and the hub 3. The present embodiment shows an example in which the airless tire 1 is formed as a tire for a passenger car.

The tread ring 2 is a section corresponding to the tread of a pneumatic tire and has a tread rubber section (2A) and a reinforcing cord layer (2B) embedded in the tread rubber section.

As for the tread rubber section (2A), rubber compositions that provide excellent tire-road friction and durability are preferred to be used. In addition, on the footprint (S) which is the outer-circumferential surface of the tread ring 2, tread grooves (not shown) having various patterns are formed to provide wet performance.

As for the reinforcing cord layer (2B), the present embodiment shows an example formed with a belt layer 5 and band layers 6, which are stacked in the radially outer or inner side of the belt layer. However, the reinforcing cord layer may also be formed using only either the belt layer 5 or the band layer 6. The belt layer 5 is formed with at least one ply—in the present embodiment two belt plies (5A, 5B)—in which tire cords are arranged at an angle of 10 to 45 degrees with respect to a tire circumferential direction. The rigidity of the tread ring 2 is enhanced by crossing each tire cord between plies. In addition, the band layer 6 is formed with one or more band plies in which tire cords are wound in a helical manner in a tire circumferential direction. There is one band ply in the present embodiment.

As a tire cord for the belt layer 5 and for the band layer 6, a steel cord and organic fiber cord may be used appropriately. Preferred examples of an organic fiber cord are high modulus fibers with greater strength and a higher elastic modulus such as aramid, polyethylene naphthalate (PEN) and polyethylene terephthalate (PET).

To form such a tread ring 2, first, a raw tread ring is formed by winding, for example, sheet material for a belt layer, sheet material for a band layer, and sheet material for a tread rubber portion in that order on a cylindrical drum in a circumferential direction. Then, the raw tread ring is vulcanized in a mold.

The hub 3 corresponds to a tire wheel, and includes a disc portion (3A) fixed to the axle (J), and cylindrical-shaped spoke mounting portion (3B) integrated with the disc portion (3A) at its radially outer edge in the present embodiment. In the center of the disc portion (3A), a hub hole (3A1) is formed, through which front end portion (Ja) of the axle (J) penetrates. Also, multiple bolt through holes (3A2) are arranged around the hub hole (3A1) for nut-locking bolt portions (Jb) positioned on the axle side. The hub 3 is preferred to be formed using metal materials such as steel, aluminum alloy, magnesium alloy and the like, the same as in a tire wheel.

Next, the spoke 4 includes a tread connection portion (4A) bonded with an inner-circumferential surface (2s) of the tread ring 2, and a hub connection portion (4B) bonded with an outer-circumferential surface (3s) of the hub 3 (in the present embodiment, the outer-circumferential surface of the spoke mounting portion (3B)). The spoke 4 is preferred to be formed using rubber, thermoplastic resins, thermosetting resins or their compositions. Especially preferred are thermosetting resins represented by urethane resin.

To bond the spoke 4 with the tread ring 2 and the hub 3 in the present embodiment, using the above listed resin material, the spoke 4 is formed through resin adhesion so as to be integrated with the tread ring 2 and the hub 3. Here, integration of those portions may also be conducted by additionally applying a desired adhesive agent on the surfaces of the tread ring 2 and the hub 3.

Figure 3:
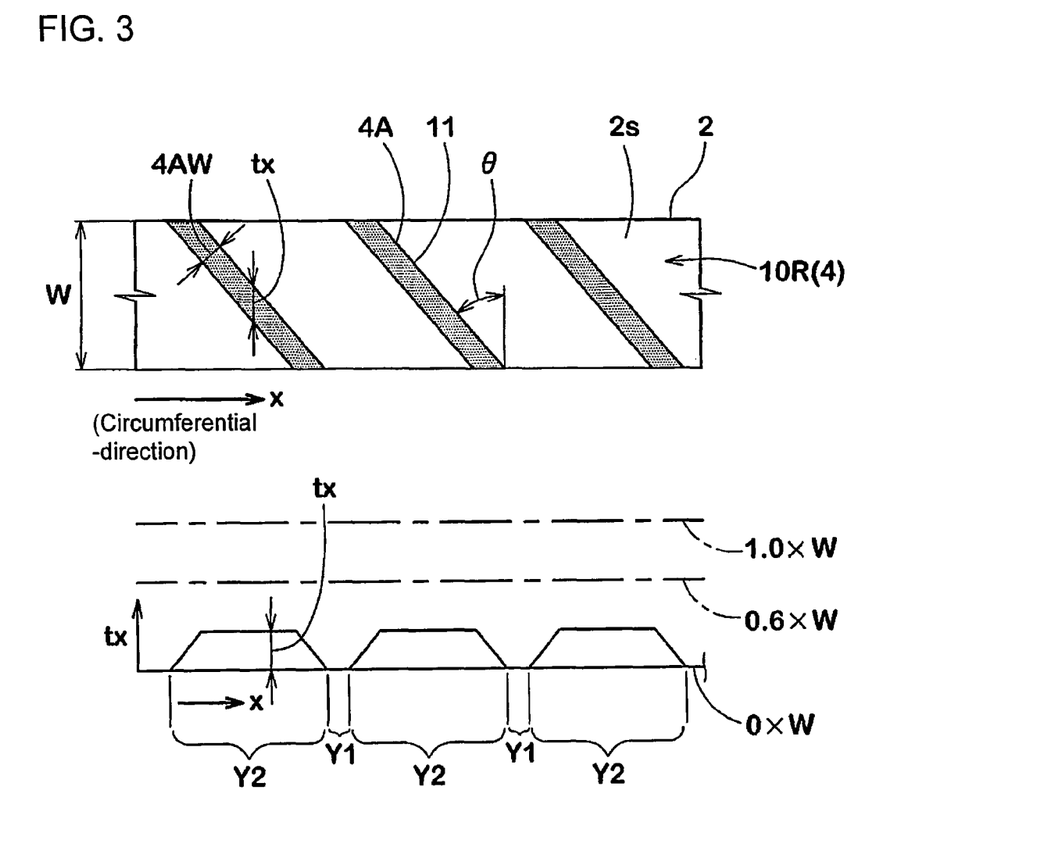
FIG. 3 shows a developed view of a tread ring seen from the inner-circumferential surface side, and a graph showing the distribution of axial component lengths of corresponding tread connection portions.

FIG. 3 is a circumferential developed view of the tread ring 2 seen from the inner-circumferential surface (2s) side. A more detailed description of the spoke 4 is provided by referring to FIG. 3. The spoke 4 of the present embodiment is formed with one or more of the spoke blade rows (10R) extending in a circumferential direction. The spoke blade row (10R) is formed with spoke blades 11 each having an inclination with respect to a tire axial direction and aligned in a circumferential direction.

In the present embodiment, an example is shown where the spoke 4 is formed with one spoke blade row (10R), using the spoke blades 11 which have the same inclination angle (θ) with respect to a tire axial direction and are arranged parallel to each other.

Regarding a tire axial component length (tx) of the tread connection portion (4A) at a point (x) in a circumferential direction of the tread ring 2, the distribution of the component lengths (tx) along the entire tire circumference is set as follows. The distribution is divided into a first region (Y1) being a circumferential region where the component length (tx) is zero times the tire axial-direction width (W) on the inner surface (2s) of the tread ring 2;

a second region (Y2) being a circumferential region where the component length (tx) is greater than zero times but smaller than 0.6 times the tire axial-direction width (W); and a third region (Y3) being a circumferential region where the component length (tx) is no smaller than 0.6 times but no greater than 1.0 times the tire axial-direction width (W).

A ratio (E1) of the first region (Y1), a ratio (E2) of the second region (Y2) and a ratio (E3) of the third region (Y3) that respectively occupy the entire circumference of a tire satisfy the above formulas (1)~(3) respectively. In the example shown in FIG. 3, no third region (Y3) exists, and thus the ratio (E3) is zero.

As described above, by setting the distribution of the tire axial component lengths (tx) of the tread connection portions (4A), the mass of the spoke 4 is kept low while vibration is reduced.

Figure 5:
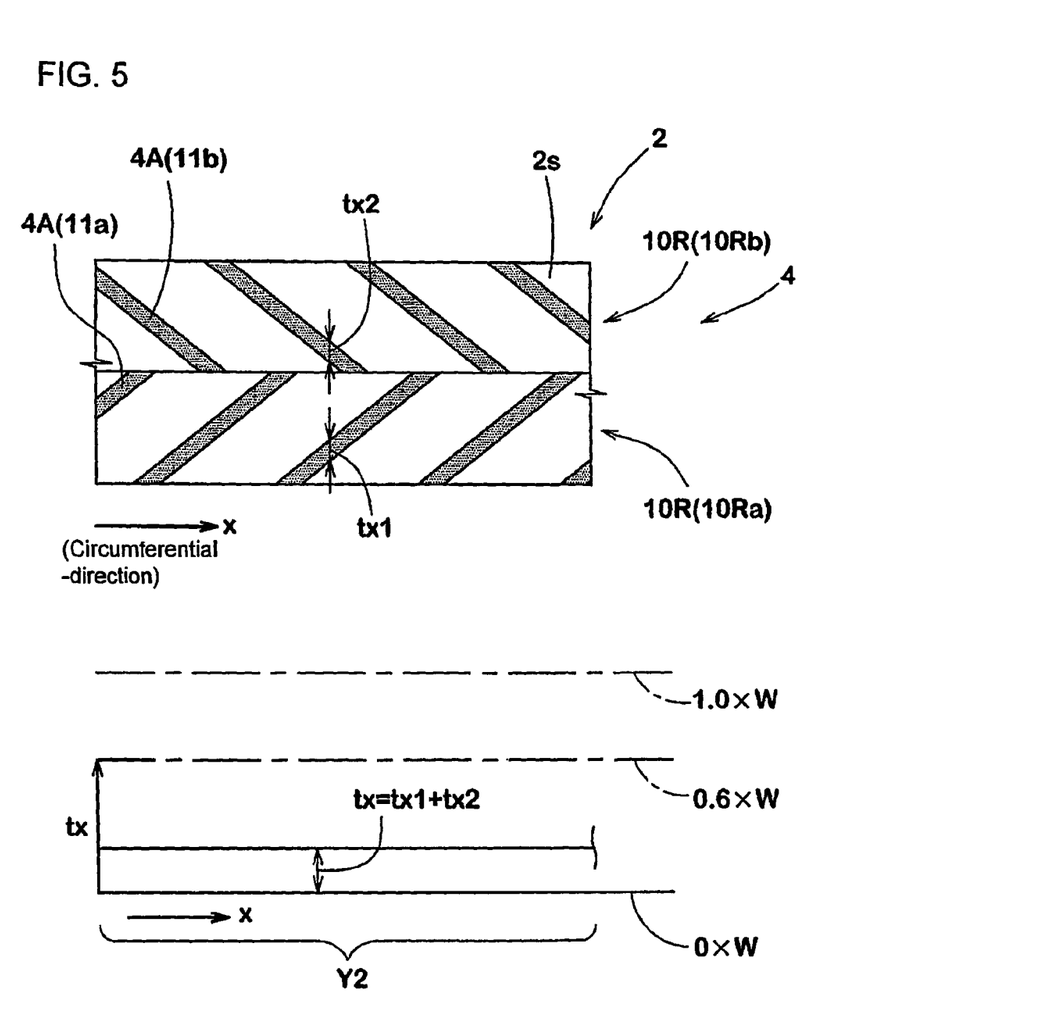
FIG. 5 shows a developed view of a tread ring of another example seen from the inner-circumferential surface side, and a graph showing the distribution of axial component lengths of corresponding tread connection portions.

When the multiple spoke blades 11 overlap in the tire axial direction as shown in FIG. 5, "the tire axial component length (tx) of the tread connection portion (4A) at each point (x) of the tread ring 2 in a tire circumferential direction" is obtained as the sum of "tx1+tx2" when the tire axial component lengths (tx) of their respective tread connection portions (4A) at a point (x) are set as tx1 and tx2 respectively in the present embodiment.

In the third region (Y3), the tire axial component length (tx) of the tread connection portion (4A) is set longer, at 0.6 W or greater. Accordingly, if the ratio (E3) of the third region (Y3) exceeds 0.3, the proportion occupied by spoke 4 increases, and the tire is prevented from becoming lightweight.

Also, in the second region (Y2), the tire axial component length (tx) is set appropriately, thus the distribution of the component lengths (tx) is made uniform and suppressed from varying. Accordingly, a change in the load on the axle (J) when the tire rolls is suppressed, and the vibration reduction performance of the tire is improved. In addition, the first region (Y1) is positioned where no tread connection portion (4A) exists. If the ratio (E1) of the first region (Y1) exceeds 0.5, that would inevitably decrease the ratio (E2) of the second region (Y2), thereby decreasing the effect of reducing vibration. From the viewpoints above, the ratio (E2) of the second region (Y2) along the entire tire circumference is preferred to be set at no less than 0.5, more preferably at no less than 0.7, and most preferably at 1.0. Furthermore, ratios (E1, E3) of the first and third regions (Y1, Y3) are preferred to be smaller within the above range.

In the airless tire 1, when the volume of the space between the inner-circumferential surface (2s) of the tread ring 2 and the outer-circumferential surface (3s) of the hub 3 is set as (Va), and the entire volume of the spoke 4 is set as (Vs), a ratio Vs/Va is preferred to be 0.001~0.4. Strictly speaking, the space volume (Va) is the volume of the space surrounded by the inner-circumferential surface (2s), the outer-circumferential surface (3s), the side surfaces connecting the side peripheries of the inner-circumferential surface (2s) and the side peripheries of the outer-circumferential surface (3s).

If the ratio Vs/Va is below 0.001, the proportion occupied by the spoke 4 is insufficient, and the tire cannot support the vehicle load well. As a result, tire strength and durability are lowered. On the other hand, if the ratio Vs/Va exceeds 0.4, the tire mass increases beyond what is needed, offsetting the advantages of a spoke structure. Considering those viewpoints, the minimum value of ratio Vs/Va is more preferred to be set at no smaller than 0.01, and the maximum value at no greater than 0.2.

In the airless tire 1, the longitudinal spring constant (K) of the tread ring 2 is preferred to be in a range of 0.01 to 100.00 kN/mm. If the longitudinal spring constant (K) is below 0.01 kN/mm, the tire cannot support the vehicle load sufficiently, resulting in lowered steering stability and durability. On the other hand, if the longitudinal spring constant (K) exceeds 100.00 kN/mm, riding comfort is lowered. From those viewpoints, the minimum value of the longitudinal spring constant (K) is more preferred to be set at no less than 1.0 kN/mm, and the maximum value at no greater than 50 kN/mm.

The longitudinal spring constant (K) is obtained by measuring the longitudinal deflection amount ε (mm) when a longitudinal load (F) (kN) is exerted from above in a single tread ring 2. When the longitudinal deflection amount ε (mm) is within a range of 0% to 10% of the outer diameter of the tread ring 2, such a value is used.

Figure 4A:
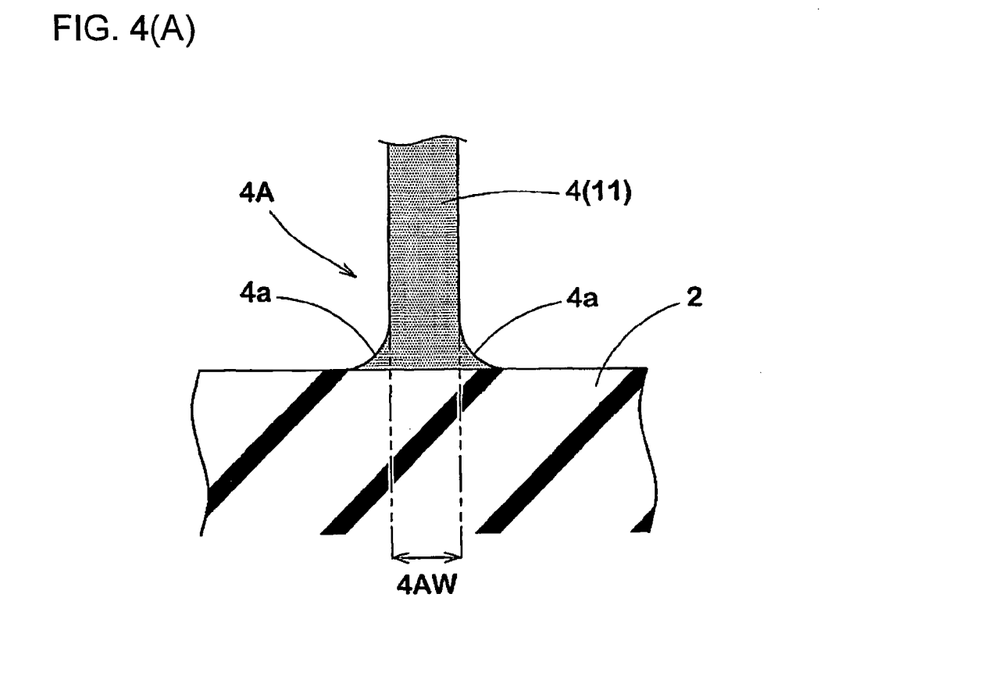
FIGS. 4(A) and 4(B) are cross-sectional views showing how to determine the width of a tread connection portion.
Figure 4B:
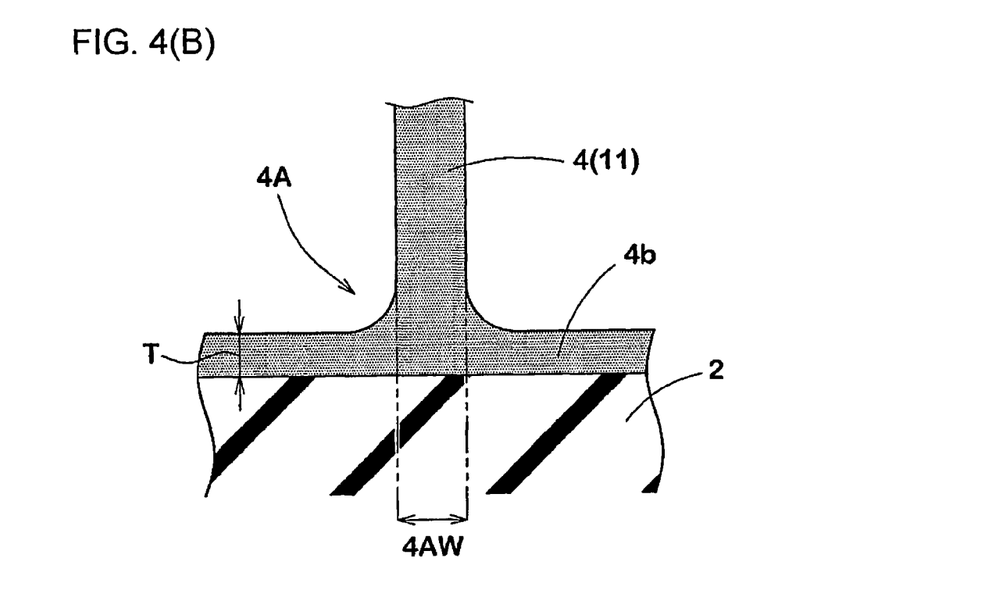

As shown in FIG. 4(A), to enhance the bonding strength of the spoke 4 and the tread ring 2, a triangular or arc bulged portion (4a) is provided at a radially outer edge of the spoke 4 so as to increase the contact area of the spoke 4 and the tread ring 2. In such a case, the width between virtual lines that exclude the bulged portion (4a) is employed as a width (4AW) of tread connection portion (4A). Also, to enhance the bonding strength of the spoke 4 and the tread ring 2, an inner ring portion (4b) may be provided at a radially outer edge of the spoke 4 as shown in FIG. 4B. When a thickness (T) of the inner ring portion (4b) is no greater than 7 mm, the width between virtual lines that exclude the inner ring portion (4b) is employed as the width (4AW) of the tread connection portion (4A). Subsequently, the tire axial component length (tx) of the tread connection portion (4A) is set based on the width (4AW) of the tread connection portion (4A), the angle (θ), a blade arrangement pitch and number of rows and the like of the spoke blades 11.

Next, another embodiment of the spoke 4 is shown in FIG. 5. FIG. 5 is a developed view in a circumferential direction seen from the inner-circumferential surface (2s) side of the tread ring 2. The spoke 4 of that embodiment has two spoke blade rows (10R) extending in a circumferential direction. One of the spoke rows (10R) indicates a first inclination spoke blade row (10Ra), which is made up of the first inclination spoke blades (11a) inclined to one side with respect to a tire axial direction and arranged parallel to each other; and the other spoke blade row (10R) indicates a second inclination spoke blade row (10Rb), which is made up of second inclination spoke blades (11b) inclined to the other side with respect to the tire axial direction and arranged parallel to each other.

The blade arrangement pitch of the first inclination spoke blade row (10Ra) is the same as that of the second inclination spoke blade row (10Rb), and their pitch phases are shifted from each other by half a pitch in the present embodiment. As described, by using the first inclination and second inclination spoke blade rows (10Ra, 10Rb) with different inclination directions, symmetrical features on right and left sides of a tire are enhanced to improve uniformity of the tire, while suppressing vehicle drift. In addition, when their pitch phases are shifted from each other by half a pitch, the ratio (E1) of the first region (Y1) is reduced to zero, the distribution is made even more uniform, and vibration is significantly reduced.

Yet other examples of the spoke 4 are shown in FIG. 6(A)~6(E).

Figure 6A:
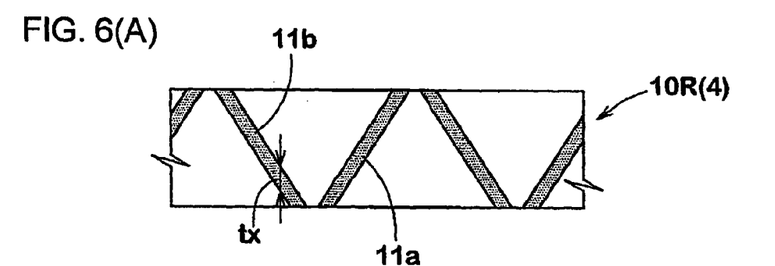
FIGS. 6(A)~6(E) are developed views showing yet other examples of a tread ring seen from the inner-circumferential surface side.

In the example of FIG. 6(A), the spoke 4 is formed as one spoke blade row (10R), having the first inclination spoke blades (11a) inclined to one side with respect to a tire axial direction and the second inclination spoke blades (11b) inclined to the other side with respect to the tire axial direction. The first inclination spoke blades (11a) and second inclination spoke blades (11b) are positioned alternately in a circumferential direction. Accordingly, despite the one-row structure of spoke blade row (10R), the spoke 4 is capable of enhancing the symmetrical features of the right and left sides of a tire the same as in the example in FIG. 5 so that uniformity of the tire is improved, while vehicle drift is suppressed.

Figure 6B:
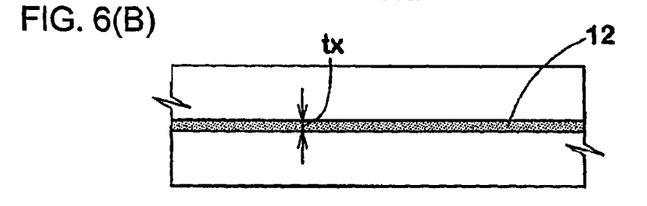
Figure 6C:
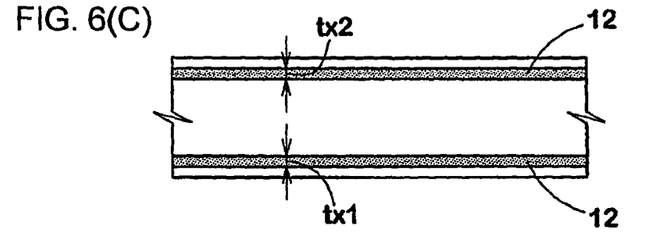
Figure 6D:
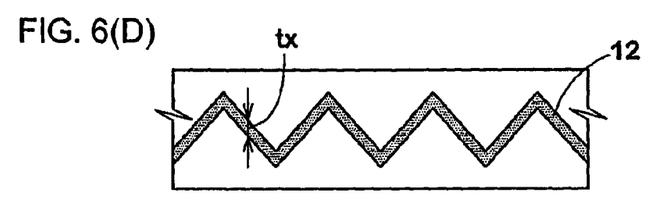
Figure 6E:
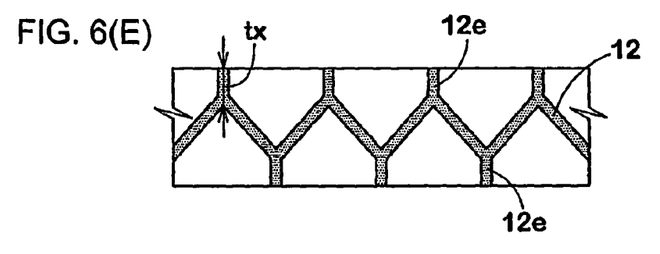

In FIG. 6(B)~(E), the spoke 4 has one or more spoke blades 12 extending continuously in a circumferential direction. In FIGS. 6(B) and 6(C), a circumferential-direction spoke blade 12 extends straight in a circumferential direction, whereas in FIGS. 6(D) and 6(E), the circumferential direction spoke blade 12 extends zigzag in a circumferential direction. Also, as represented in FIG. 6(E), when the spoke 4 has circumferential-direction spoke blades 12, a side blade portion (12e) extending from a side surface of the spoke blade 12 toward the outer side in the axial direction may be provided to enhance rigidity. Especially, when the circumferential direction spoke blade 12 is a zigzag type, the side blade portion (12e) is preferred to be formed at the corners of the zigzag shape.

So far, preferred embodiments of the present invention have been described. However, the present invention is not limited to those embodiments, and may also be carried out by various modifications of those embodiments.

EXAMPLES

To confirm the effects according to an embodiment of the present invention, test tires for a passenger car (tires corresponding to a tire size of 145/70R12) are prepared according to the specifications in Table 1. Vibration reduction performance, riding comfort, steering stability and durability of each test tire were tested. Also, the mass of each spoke was measured to compare the degree of weight reduction.

Each test tire was prepared the same, except for the specifications described in Table 1. The longitudinal spring constant (K) of a tread ring was set differently by changing the number of implanted tire cords or the number of plies in the reinforcing cord layer. A spoke was formed to be integrated with the tread ring and the hub by using injection molding of urethane resin (thermosetting resin).

(1) Vibration Reduction Performance, Riding Comfort, Steering Stability:

Test tires were mounted on four wheels of a vehicle (Ultra Compact EV: brand name CMOS), and the vehicle was driven on a dry asphalt test course. Vibration reduction performance, riding comfort and steering stability were evaluated by the senses of the driver. The evaluation results are shown in indices based on a value obtained in Comparative Example 1 and set as 100. The greater the number, the higher the indication of excellence in the above mentioned features.

(2) Durability:

Using a drum testing machine, test tires were each driven at a speed of 100 km/h on the drum under a load of 3 kN. The distance driven before any problem occurred in the test tire was shown in indices based on the distance in Comparative Example 1 set as 100. The greater the number, the higher the indication of excellence in durability.

(3) Mass of Spoke:

Using the difference of tire mass before and after the tire was produced, the mass of the spoke was measured, and the results were shown in indices based on the value in Comparative Example 1 and set as 100. The greater the number, the lighter the spoke.

TABLE 1

Figure 7A:
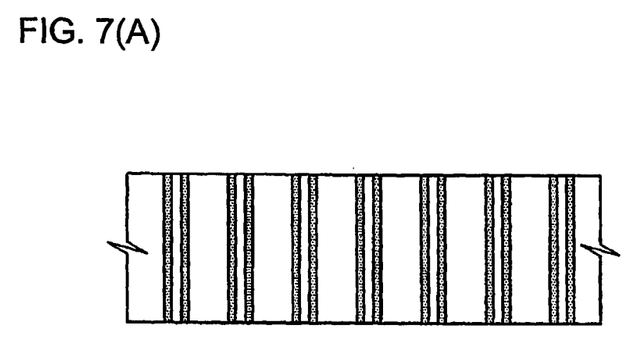
FIGS. 7(A) and 7(B) are developed views showing concepts of spoke arrays of comparative examples in Table 1.

|  | example 1 | comparative example 1 | example 2 | example 3 | comparative example 2 | comparative example 3 | comparative example 4 | example 4 | example 5 | example 6 | example 7 |
| --- | --- | --- | --- | --- | --- | --- | --- | --- | --- | --- | --- |
| shape of spoke | FIG. 6(A) | FIG. 7(A) | FIG. 6(A) | FIG. 6(A) | FIG. 6(A) | FIG. 6(A) | FIG. 6(A) | FIG. 6(A) | FIG. 6(A) | FIG. 6(A) | FIG. 6(A) |
| ratio (E1) | 0 | 0.9 | 0.3 | 0.5 | 0.6 | 0 | 0 | 0 | 0 | 0 | 0 |
| ratio (E2) | 1 | 0 | 0.7 | 0.5 | 0.4 | 0.7 | 0 | 1 | 1 | 1 | 1 |

TABLE 1-continued

| ratio (E3) | 0 | 0.1 | 0 | 0 | 0 | 0.3 | 1 | 0 | 0 | 0 | 0 |
|---|---|---|---|---|---|---|---|---|---|---|---|
| longitudinal spring constant of tread ring (kN/mm) |  |  |  | 1 |  |  |  | 200 | 100 | 0.01 | 0.005 |
| volume ratio of spoke Vs/Va |  |  |  | 0.1 |  |  | 0.5 |  |  | 0.1 |  |
| vibration performance | 500 | 100 | 300 | 250 | 150 | 110 | 500 | 500 | 500 | 400 | 400 |
| riding comfort | 100 | 100 | 100 | 100 | 100 | 90 | 70 | 30 | 70 | 130 | 100 |
| steering stability | 100 | 100 | 100 | 100 | 100 | 100 | 100 | 100 | 130 | 70 | 20 |
| Durability | 100 | 100 | 100 | 100 | 100 | 100 | 100 | 100 | 150 | 70 | 30 |
| mass of spoke | 100 | 100 | 100 | 100 | 100 | 100 | 20 | 100 | 100 | 100 | 100 |

Figure 7B:
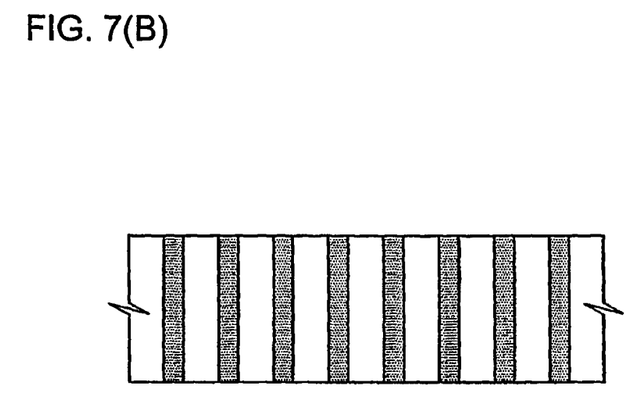

|  | example 8 | example 9 | example 10 | example 11 | example 12 | comparative example 5 | example 13 | example 14 | example 15 | example 16 | example 17 | example 18 |
|---|---|---|---|---|---|---|---|---|---|---|---|---|
| shape of spoke | FIG. 6(A) | FIG. 6(A) | FIG. 6(A) | FIG. 6(A) | FIG. 6(A) | FIG. 7(B) | FIG. 6(B) | FIG. 6(C) | FIG. 5 | FIG. 3 | FIG. 6(D) | FIG. 6(E) |
| ratio (E1) | 0 | 0 | 0 | 0 | 0 | 0.9 | 0 | 0 | 0 | 0 | 0 | 0 |
| ratio (E2) | 1 | 1 | 1 | 1 | 1 | 0 | 1 | 1 | 1 | 1 | 1 | 1 |
| ratio (E3) | 0 | 0 | 0 | 0 | 0 | 0.1 | 0 | 0 | 0 | 0 | 0 | 0 |
| longitudinal spring constant of tread ring (kN/mm) |  |  |  |  |  | 1 |  |  |  |  |  |  |
| volume ratio of spoke Vs/Va | 0.001 | 0.2 | 0.4 | 0.5 | 0.005 | 0.1 | 0.1 | 0.1 | 0.1 | 0.1 | 0.1 | 0.1 |
| vibration performance | 500 | 500 | 500 | 500 | 500 | 100 | 800 | 800 | 400 | 500 | 500 | 500 |
| riding comfort | 150 | 90 | 70 | 50 | 150 | 100 | 100 | 100 | 120 | 100 | 100 | 100 |
| steering stability | 70 | 110 | 130 | 50 | 100 | 100 | 90 | 90 | 120 | 100 | 100 | 100 |
| Durability | 70 | 110 | 130 | 150 | 80 | 100 | 90 | 90 | 100 | 100 | 100 | 100 |
| mass of spoke | 10000 | 50 | 25 | 20 | 2000 | 100 | 100 | 100 | 100 | 100 | 120 | 90 |

In airless tires with "spoke structure," spoke blades may be provided to be spaced apart in a circumferential direction. Regarding a length (tx) of the tire axial component at a portion where the spoke and tread ring connect, when the distribution of the axial component lengths (tx) along the entire tire circumference is uneven and the values of the axial component lengths (tx) vary significantly, a change in the load exerted on the axle is also significant when the tire rolls, causing vibration in the vehicle.

An airless tire according to an embodiment of the present invention provides improved vibration reduction performance while securing the advantages of a spoke structure such as lightweight and riding comfort.

According to an embodiment of the present invention, an airless tire is provided with a cylindrical tread ring with a footprint, a hub that is positioned on the radially inner side of the tread ring and is fixed to an axle, and a spoke connecting the tread ring and the hub. In such an airless tire, the spoke has a tread connection portion to be connected to an inner circumferential surface of the tread ring, and a hub connection portion to be connected to an outer circumferential surface of the hub. Regarding a tire axial component length (tx) of the tread connection portion at a point (x) in a circumferential direction of the tread ring, when the distribution of component lengths (tx) along the entire tire circumference is divided into

- a first region (Y1) being a circumferential region where the component length (tx) is zero times the tire axial-direction width (W) on the inner surface of the tread ring;
- a second region (Y2) being a circumferential region where the component length (tx) is greater than zero times but smaller than 0.6 times the tire axial-direction width (W); and
- a third region (Y3) being a circumferential region where the component length (tx) is no smaller than 0.6 times but no greater than 1.0 times the tire axial-direction width (W), a ratio (E1) of the first region (Y1), a ratio (E2) of the second region (Y2) and a ratio (E3) of the third region (Y3) that respectively occupy the entire circumference of a tire are characterized by satisfying the following formulas (1)~(3) respectively.

$$0 \leq E1 \leq 0.5 \tag{1}$$

$$0 < E2 \leq 1.0 \tag{2}$$

$$0 \leq E3 < 0.3 \tag{3}$$

In an airless tire according to an embodiment of the present invention, the tread ring is preferred to have a longitudinal spring constant (K) in a range of 0.01~100.00 kN/mm.

In an airless tire according to an embodiment of the present invention, when a volume of the space between the inner-circumferential surface of the tread ring and the outer-circumferential surface of the hub is set as (Va), and an entire volume of the spoke is set as (Vs), a ratio Vs/Va is preferred to be 0.001~0.4.

In an airless tire according to an embodiment of the present invention, the spoke has one or more rows of spoke blades extending in a circumferential direction, and the spoke blades are preferred to be inclined with respect to a tire axial direction and aligned in a circumferential direction.

In the spoke blade row of an airless tire according to an embodiment of the present invention, spoke blades may be inclined at the same inclination angle with respect to a tire axial direction and positioned parallel to each other.

In the spoke blade row of an airless tire according to an embodiment of the present invention, it is an option to have a first inclination spoke blade inclined to one side with respect to a tire axial direction and a second inclination spoke blade inclined to the other side with respect to the tire axial direction, and to arrange the first inclination spoke blade and the second inclination spoke blade alternately in a circumferential direction.

The spoke of an airless tire according to an embodiment of the present invention has two rows of spoke blades, one row of spoke blades being made up of the first inclination spoke blades which are inclined to one side with respect to a tire axial direction and are arranged parallel to each other, and the other being made up of the second inclination spoke blades which are inclined to the other side with respect to the tire axial direction and are arranged parallel to each other.

In an airless tire according to an embodiment of the present invention, the spoke may have one or more circumferential-direction spoke blades that extend continuously in a circumferential direction.

In an airless tire according to an embodiment of the present invention, the circumferential-direction spoke blade may extend zigzag or straight in a circumferential direction.

As described above, in an airless tire according to an embodiment of the present invention, the distribution of the tire axial component lengths (tx) of tread connection portions along the entire tire circumference is set as follows. Namely, when a first region (Y1) is set as a circumferential region where the component length (tx) is zero times the tire axial-direction width (W) on the inner surface of the tread ring;

a second region (Y2) is set as a circumferential region where the component length (tx) is greater than zero times but smaller than 0.6 times the tire axial-direction width (W); and a third region (Y3) is set as a circumferential region where the component length (tx) is no smaller than 0.6 times but no greater than 1.0 times the tire axial-direction width (W), a ratio (E1) of the first region (Y1), a ratio (E2) of the second region (Y2) and a ratio (E3) of the third region (Y3) that respectively occupy the entire circumference of a tire are set to satisfy the following formulas (1)~(3) respectively.

$$0 \leq E1 \leq 0.5 \quad (1)$$

$$0 < E2 \leq 1.0 \quad (2)$$

$$0 \leq E3 < 0.3 \quad (3)$$

In the third region (Y3), the tire axial component length (tx) of a tread connection portion is set greater, and if the ratio (E3) of the third region (Y3) is 0.3 or greater, the spoke becomes heavier than necessary, and a lightweight tire cannot be attained. Also, in the second region (Y2), the tire axial component length (tx) of the tread connection portion is set appropriately, thus the component length (tx) is made uniform and is suppressed from varying. Accordingly, a change in the load on the axle when the tire rolls is suppressed, and the vibration reduction performance of the tire is improved. In addition, the first region (Y1) is positioned where no tread connection portion exists. If the ratio (E1) of the first region (Y1) exceeds 0.5, that would inevitably decrease the ratio (E2) of the second region (Y2), thereby decreasing the effect of reducing vibration.

Obviously, numerous modifications and variations of the present invention are possible in light of the above teachings. It is therefore to be understood that within the scope of the appended claims, the invention may be practiced otherwise than as specifically described herein.

What is claimed is:

1. An airless tire, comprising:
   a tread ring having a footprint;
   a hub positioned on a radially inner side of the tread ring and configured to be fixed to an axle; and
   a spoke connecting the tread ring and the hub and having a tread connection portion connected to an inner-circumferential surface of the tread ring and a hub connection portion connected to an outer-circumferential surface of the hub,
   wherein the tread ring and the tread connection portion of the spoke satisfy $0 \leq E1 \leq 0.5$, $0 < E2 \leq 1.0$ and $0 \leq E3 < 0.3$, where E1 represents a ratio of a first region on the inner-circumferential surface of the tread ring, E2 represents a ratio of a second region on the inner-circumferential surface of the tread ring, E3 represents a ratio of a third region on the inner-circumferential surface of the tread ring, the first region is a circumferential region occupying around an entire circumference of the airless tire and having a component length being zero times a tire axial-direction width on the inner-circumferential surface of the tread ring, the second region is a circumferential region occupying around the entire circumference of the airless tire and having the component length in a range of greater than zero times and smaller than 0.6 times the tire axial-direction width, the third region is a circumferential region occupying around the entire circumference of the airless tire and having the component length in a range of 0.6 times or greater and 1.0 times or less the tire axial-direction width, and the component length is a tire axial component length of the tread connection portion measured at a point in a circumferential direction of the tread ring.

2. The airless tire according to claim 1, wherein the tread ring is set to have a longitudinal spring constant in a range of 0.01~100.00 kN/mm.

3. The airless tire according to claim 1, wherein the ratio of an entire volume, Vs, of the spoke to a volume, Va, of a space between the inner-circumferential surface of the tread ring and the outer-circumferential surface of the hub is set at Vs/Va=0.001~0.4.

4. The airless tire according to claim 2, wherein the ratio of an entire volume, Vs, of the spoke to a volume, Va, of a space between the inner-circumferential surface of the tread ring and the outer-circumferential surface of the hub is set at Vs/Va=0.001~0.4.

5. The airless tire according to claim 1, wherein the spoke comprises at least one row of spoke blades extending in the circumferential direction, and the spoke blades are inclined with respect to a tire axial direction and aligned in the circumferential direction.

6. The airless tire according to claim 2, wherein the spoke comprises at least one row of spoke blades extending in the circumferential direction, and the spoke blades are inclined with respect to a tire axial direction and aligned in the circumferential direction.

7. The airless tire according to claim 3, wherein the spoke comprises at least one row of spoke blades extending in the circumferential direction, and the spoke blades are inclined with respect to a tire axial direction and aligned in the circumferential direction.

8. The airless tire according to claim 5, wherein the spoke blades are inclined at the same inclination angle with respect to the tire axial direction and positioned parallel to each other.

9. The airless tire according to claim 6, wherein the spoke blades are inclined at the same inclination angle with respect to the tire axial direction and positioned parallel to each other.

10. The airless tire according to claim 7, wherein the spoke blades are inclined at the same inclination angle with respect to the tire axial direction and positioned parallel to each other.

11. The airless tire according to claim 5, wherein the row of spoke blades includes a plurality of first inclination spoke blades inclined to a first side with respect to the tire axial direction and a plurality of second inclination spoke blades inclined to a second side with respect to the tire axial direction, and the first inclination spoke blades and the second inclination spoke blades are positioned alternately in the circumferential direction.

12. The airless tire according to claim 6, wherein the row of spoke blades includes a plurality of first inclination spoke blades inclined to a first side with respect to the tire axial direction and a plurality of second inclination spoke blades inclined to a second side with respect to the tire axial direction, and the first inclination spoke blades and the second inclination spoke blades are positioned alternately in the circumferential direction.

13. The airless tire according to claim 7, wherein the row of spoke blades includes a plurality of first inclination spoke blades inclined to a first side with respect to the tire axial direction and a plurality of second inclination spoke blades inclined to a second side with respect to the tire axial direction, and the first inclination spoke blades and the second inclination spoke blades are positioned alternately in the circumferential direction.

14. The airless tire according to claim 5, wherein the spoke comprises first and second rows of spoke blades, the first row of spoke blades comprises a plurality of first inclination spoke blades inclined to a first side with respect to the tire axial direction and positioned parallel to each other, and the second row of spoke blades comprises a plurality of second inclination spoke blades inclined to a second side with respect to the tire axial direction and positioned parallel to each other.

15. The airless tire according to claim 6, wherein the spoke comprises first and second rows of spoke blades, the first row of spoke blades comprises a plurality of first inclination spoke blades inclined to a first side with respect to the tire axial direction and positioned parallel to each other, and the second row of spoke blades comprises a plurality of second inclination spoke blades inclined to a second side with respect to the tire axial direction and positioned parallel to each other.

16. The airless tire according to claim 7, wherein the spoke comprises first and second rows of spoke blades, the first row of spoke blades comprises a plurality of first inclination spoke blades inclined to a first side with respect to the tire axial direction and positioned parallel to each other, and the second row of spoke blades comprises a plurality of second inclination spoke blades inclined to a second side with respect to the tire axial direction and positioned parallel to each other.

17. The airless tire according to claim 1, wherein the spoke comprises at least one circumferential-direction spoke blade extending continuously in the circumferential direction.

18. The airless tire according to claim 17, wherein the circumferential-direction spoke blade is formed such that the circumferential-direction spoke blade is extending in a zigzag line in the circumferential direction.

19. The airless tire according to claim 17, wherein the circumferential-direction spoke blade is formed such that the circumferential-direction spoke blade is extending in a straight line in the circumferential direction.

* * * * *